US005867181A

United States Patent [19]

Nakane et al.

[11] Patent Number: 5,867,181

[45] Date of Patent: *Feb. 2, 1999

[54] IMAGE FORMING APPARATUS FOR FORMING IMAGE ON SINGLE SHEET BY DIFFERENT RECORDING METHODS

[75] Inventors: Naohiro Nakane, Yokohama; Kenji Muto, Kawasaki, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 628,163

[22] Filed: Apr. 5, 1996

[30] Foreign Application Priority Data

Apr. 10, 1995 [JP] Japan .................................... 7-108990

[51] Int. Cl.[6] ................................ B41J 3/00; G01D 9/04; G01D 9/08

[52] U.S. Cl. ................................................... 347/2; 346/44

[58] Field of Search .......................... 347/2, 104; 346/44; 399/303, 401; 355/202, 200

[56] References Cited

U.S. PATENT DOCUMENTS

| | | | |
|---|---|---|---|
| 5,081,596 | 1/1992 | Vincent et al. | 346/44 |
| 5,321,467 | 6/1994 | Tanaka et al. | 355/202 |
| 5,518,231 | 5/1996 | Reddy | 355/309 |
| 5,583,613 | 12/1996 | Kobayashi et al. | 355/200 |

FOREIGN PATENT DOCUMENTS

| | | |
|---|---|---|
| 4-294379 | 10/1992 | Japan . |
| 5-006127 | 1/1993 | Japan . |
| 5-4134824 | 6/1993 | Japan . |

*Primary Examiner*—N. Le
*Assistant Examiner*—Thinh Nguyen
*Attorney, Agent, or Firm*—Fitzpatrick, Cella, Harper & Scinto

[57] ABSTRACT

An image forming apparatus forms a multi-image on a single recording sheet by different recording methods. The apparatus comprises a first recording device, a second recording device having a recording type different from that of the first recording device, and a conveyor to support the recording sheet and being movable along an endless convey path to successively convey the recording sheet to recording positions of the first and second recording devices.

19 Claims, 14 Drawing Sheets

IMAGE FORMING APPARATUS FOR FORMING IMAGE ON SINGLE SHEET BY DIFFERENT RECORDING METHODS

BACKGROUND OF THE INVENTION

1. Field of the Invention

The present invention relates to an image forming apparatus for forming a color image on a recording material, and more particularly, it relates to a recording apparatus as an image output device for a computer and a copying apparatus for a color original.

2. Related Background Art

In image forming apparatuses, particularly, in copying machines and printers, which have been widely used in offices, it has been requested that the apparatus be made compact, be operated at a higher speed and obtain a high quality image.

Among image forming methods in the image forming apparatuses, there have been proposed an electrophotographic method and an ink jet method. In the electrophotographic method, for example, a toner image is formed on a photosensitive drum by a charge means, an exposure means and a developing means which are disposed around the photosensitive drum, and, after the toner image is transferred onto a recording medium (referred to as "recording sheet" hereinafter) by a transfer means, the transferred toner image is fixed to the recording sheet by a fixing means. This method can form a high quality image at a high speed. However, although mono-color image forming apparatuses utilizing such an electrophotographic method can be made compact (for example, desk-top type), color image forming apparatuses utilizing such an electrophotographic method causes a problem that they are made bulky and expensive.

On the other hand, in the ink jet method, an ink image is directly formed on a recording sheet by discharging ink droplets from a recording head. Although this method can be made compact, an image forming speed and image quality are worsened in comparison with the electrophotographic method in both mono-color image forming apparatuses and color image forming apparatuses. In particular, regarding character or letter images, when the character image is superimposed on the color image, there arises a problem that the character image is spread on the color image.

In order to solve the above problems, there have been proposed image forming apparatuses having both an image forming means utilizing an electrophotographic method and an image forming means utilizing an ink jet method, as disclosed in the Japanese Patent Application Laid-open Nos. 4-294379, 5-6127 and 5-134824. In such image forming apparatuses, the image forming methods are switched appropriately so that mono-color images mainly including character images which are frequently required in offices are formed by the electrophotographic method and color images which are not frequently required in offices are formed by the ink jet method. By switching the image forming methods in this way, the optimum image forming apparatus can be used in each office. That is to say, in the image forming apparatus including both of the above-mentioned methods, the installation space in the office can be reduced, the mono-color image can be obtained with high quality at a high speed and the color image can be obtained, if necessary.

However, in the above-mentioned conventional image forming apparatuses, since a dimension of the recording sheet is changed after the image formation is effected by the preceding image forming method, in the succeeding image forming method, even when registrating means such as regist rollers and guides are used, the mechanical position of the recording sheet will be deviated by a certain amount. As a result, when the image formation is effected by the succeeding image forming method, there arises deviation between the image formed by the preceding image forming method and the image formed by the succeeding image forming method, thereby deteriorating image quality. Particularly, when the preceding image forming method is the electrophotographic method, since the transferred toner image is permanently fixed to the recording sheet by heat and pressure, the recording sheet is contracted or shortened. Accordingly, the toner image fixed to the recording sheet is also contracted or shortened. As a result, the image formed by the succeeding image forming method is deviated from the fixed toner image, thereby worsening the image quality.

SUMMARY OF THE INVENTION

An object of the present invention is to provide an image forming apparatus which can prevent deviation between plural images formed on a single recording sheet by a plurality of image forming means.

Further, if an ink jet recording means is disposed at a downstream side of an electrophotographic recording means, since a fixing means is disposed between the electrophotographic recording means and the ink jet recording means, a distance between both recording means must be increased to prevent influence of heat from the fixing means and shift of charges passing through the recording sheet, thereby making the entire apparatus bulky.

To achieve the above object, according to the present invention, there is provided an image forming apparatus for forming an image on a single recording material by different recording methods, comprising first and second recording means having different recording methods, and a recording material conveying means movable along an endless path and adapted to convey a sheet-shaped recording material to pass through recording positions of the first and second recording means. Wherein a recording speed of the first recording means is faster than a recording speed of the second recording means, and the recording positions of the first and second recording means are shorter than a length of a maximum recording material to be conveyed, in a recording material conveying direction.

The other objects and features of the present invention will be apparent from the following detailed description of the invention referring to the accompanying drawings.

DETAILED DESCRIPTION OF THE PREFERRED EMBODIMENTS

The present invention will now be explained in connection with embodiments thereof with reference to the accompanying drawings.

(First Embodiment)

Figure 1:
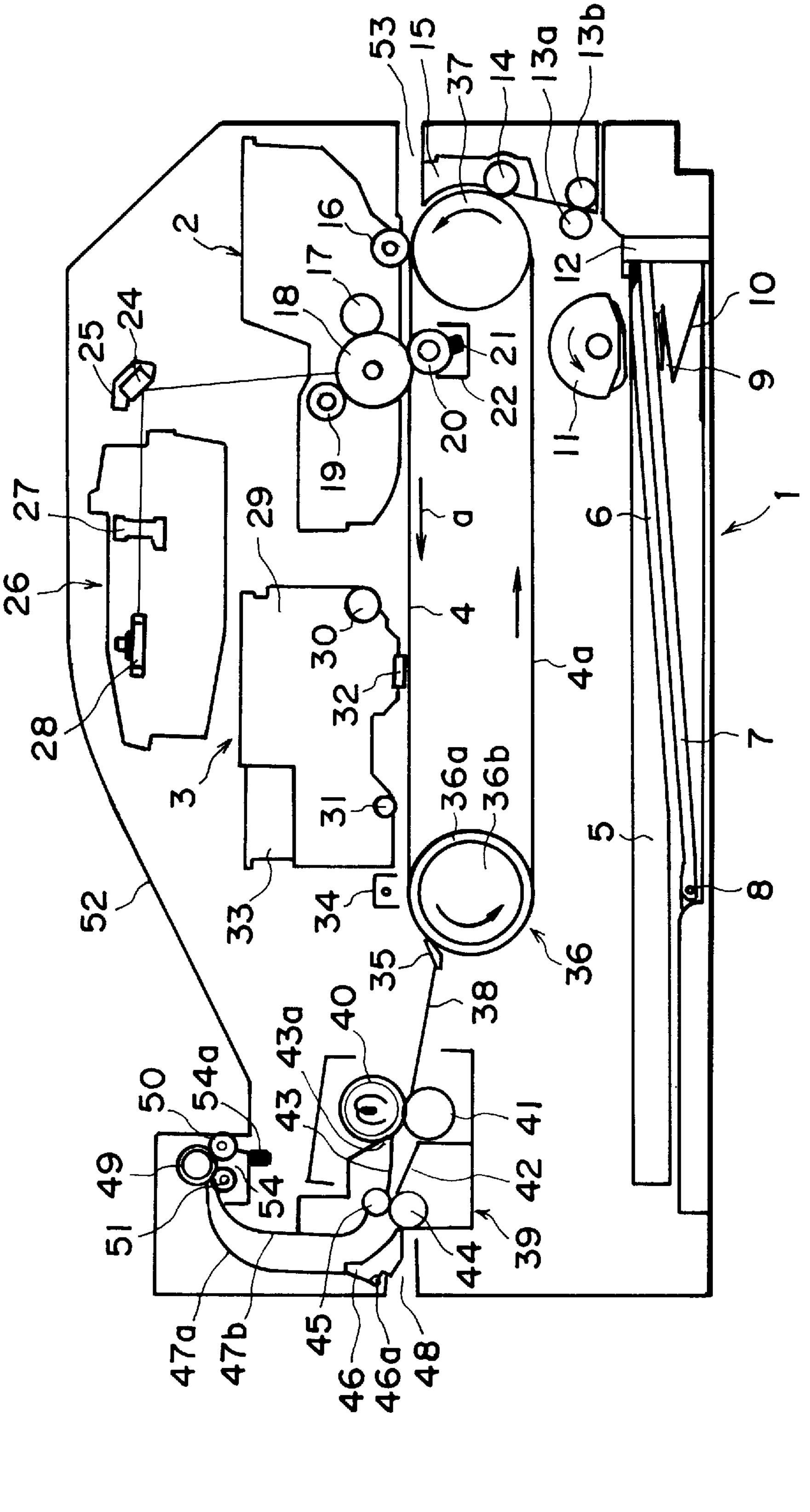
FIG. 1 is a schematic illustration showing an image forming apparatus according to a first embodiment of the present invention.

FIG. 1 is a schematic illustration showing an image forming apparatus according to a first embodiment of the present invention. The image forming apparatus includes at least two recording means having different recording methods so that an image is formed on a recording sheet 6 by these recording means.

A sheet cassette 5 containing the recording sheets 6 is disposed within the image forming apparatus, a belt (endless belt-shaped convey member) 4 is disposed at a downstream side of the sheet cassette, a first recording means 2 comprised of a process cartridge including an electrophotographic recording means 2 is disposed above the belt 4, and a second recording means 3 comprised of an ink jet recording portion of full-color type is disposed above the belt 4 and at a down stream side of the first recording means 2. A fixing device 39 is disposed at a down stream side of the first and second recording means 2, 3. Incidentally, the belt 4 is an endless belt. The belt 4 may be formed from an endless belt ring or may be formed by connecting both ends of a belt strip to each other.

Explaining in more detail, in the image forming apparatus 1, a recording sheet stack 6 contained in the sheet cassette 5 is biased upwardly by pressure springs 10 via a pressure plate 7 to be urged against a separation pawl 12, and the pressure plate 7 can be moved pivotally around bearings 8 in accordance with an amount of the recording sheets 6 rested on the plate. The pressure springs 10 are positioned by projections 9 formed on a lower surface of the pressure plate 7.

A semi-circular sheet supply roller 11 is disposed above the sheet cassette 5. When the sheet supply roller 11 is driven by a drive system (not shown) in a direction shown by the arrow in FIG. 1, the recording sheets 6 are fed out by the roller and are separated one by one by the separation pawl 12. The separated recording sheet is conveyed by a pair of regist rollers 13*a*, 13*b* and is directed to a roller 16 through a roller 14 and a sheet guide 15.

On the other hand, the convey belt 4 is supported by two rollers 36, 37 for rotational movement in a direction shown by the arrows. The roller 36 is a drive roller driven by a drive system (not shown) and the roller 37 is a driven roller. A rubber layer 36*a* coated on the roller 36 has a coefficient of friction sufficient to transmit a driving force to the belt 4 for driving the latter. In order to oppose the roller 36 to a separation corona charger 34 with the interposition of the belt 4, volume resistance of the rubber layer 36*a* has an intermediate value and a core 36*b* of the roller 36 is formed from conductive material such as metal. The drive roller 37 is subjected to tension from a tensioner (not shown) so that tension acting on the belt 4 is made optimum when the belt is driven by the roller 36.

The process cartridge constituting the first recording means 2 includes a case within which there are disposed a photosensitive drum 18, a first charger 19 for uniformly charging the photosensitive drum 18, a developing sleeve 17, toner and a toner agitating mechanism (not shown), and a cleaning blade and a waste toner container for removing residual toner remaining on the photosensitive drum 18. Further, the above-mentioned roller 16 is positioned within the case of the process cartridge.

Incidentally, the process cartridge may incorporate therein an electrophotographic photosensitive member, and a charge means, a developing means or a cleaning means as a unit which can removably be mounted to the image forming apparatus, or may incorporate therein an electrophotographic photosensitive member, and at least one of a charge means, a developing means and a cleaning means as a unit which can removably be mounted to the image forming apparatus, or may incorporate therein an electrophotographic photosensitive member, and at least a developing means as a unit which can removably be mounted to the image forming apparatus. A transfer roller 20 (with the interposition of the belt 4) is urged against a portion of the photosensitive drum 18 exposed from the case of the process cartridge constituting the first recording means 2. More specifically, the transfer roller 20 is urged against the photosensitive drum 18 by urging springs 21 for urging bearings (not shown) for supporting the transfer roller 20 toward the photosensitive drum 18. The transfer roller 20 and the springs 21 are disposed within a holder 22 to constitute a unit. Although the transfer roller 20 serves to transfer a toner image formed on the photosensitive drum 18 onto the recording sheet 6, in the illustrated embodiment, the transfer roller is controlled to absorb the recording sheet 6 to the belt 4. However, an additional corona discharger or charge roller may be provided to absorb the recording sheet 6 to the belt 4. In the illustrated embodiment, the transfer roller 20 also acts as a charge roller for absorbing the recording sheet 6 to the belt 4.

The exposure to the photosensitive drum 18 is effected by means of a scanner 26. The scanner 26 includes a polygon mirror 28 rotated by a motor (not shown) so that a laser beam emitted from a laser unit including a semiconductor laser (not shown) is directed to the photosensitive drum by the polygon mirror. The laser beam is corrected by an fθ lens 27 so that a length of a light path becomes constant, and the laser beam is incident on the photosensitive drum 18 through a mirror 24 secured to the holder 25.

Next, the second recording means 3 comprised of the ink jet recording portion of full-color type will be explained.

The ink jet recording portion includes a carriage 29 on which a recording head 32 and ink tanks 33 containing ink to be supplied to the recording head 32 are mounted. The carriage 29 is supported by two rails 30, 31 for movement in a direction perpendicular to a recording sheet conveying direction (shown by the arrow a). The ink tanks 33 contain cyan color ink, magenta color ink, yellow color ink and black color ink, respectively, and each ink tank can be exchanged by a new one independently. Accordingly, the recording head 32 is divided into four head portions corresponding to four colors and serves to record the image on the recording sheet 6 in a non-contact manner.

Further, there is provided a recovery means (not shown) for the recording head 32.

The separation corona charger 34 for separating the recording sheet 6 from the belt 4 is disposed at a downstream side of the second recording means 3 comprised of the ink jet recording portion, and a separation pawl 35 is disposed at a downstream side of the corona charger 34. The recording sheet 6 separated by the separation pawl 35 is sent to the fixing device 39 by a pre-fixing guide 38. The fixing device 39 comprises a heat roller 40 including a heater therein, and a pressure roller 41. With this arrangement, the ink and the toner on the recording sheet 6 are thermally fixed to the sheet simultaneously at a nip between the rollers 40, 41. The pressure roller 41 is urged against the heat roller 40 by a spring (not shown).

Guides 42, 43 are disposed at a downstream side of the pair of heat and pressure rollers 40, 41 of the fixing device 39. The recording sheet leaves the fixing device and is discharged toward a downstream side by a pair of discharge rollers 44, 45 while being guided by the guides 42, 43. A portion of the guide 43 contacted with the heat roller 40 acts as a separation pawl 43*a*. The recording sheet is directed to curl correction rollers 49, 50, 51 by a flapper 46 and guides 47*a*, 47*b*. The curl operation rollers 50, 51 are mounted on a holder 54 which is biased toward the curl correction roller 49 by a spring 54*a* to permit the curl correction.

The recording sheet 6 discharged from the curl correction means is discharged onto a stacker 52 defined on an upper surface of the apparatus with the imaged surface facing downwardly (face-down). Further, there is provided a manual sheet insertion opening 53 which is used when it is desired to record an image on a thick sheet or a thin sheet which is hard to be supplied from a sheet cassette. When the thick sheet which is hard to be guided by the guides 47*a*, 47*b* is used, the flapper 46 is rotated around a bearing portion 46*a* in an anti-clockwise direction in FIG. 1 so that the thick sheet can be discharged through a discharge opening 48 with the imaged surface facing upwardly (face-up).

Next, an actual operation of the first embodiment will be explained.

The image forming apparatus 1 is constituted as a printer connected to a computer or an original reading scanner so that color image data from the computer or the original reading scanner is color-decomposed by a controller into a color image and a mono-color (black/white) image such as characters. With this arrangement, the mono-color image can be recorded by the first recording means 2 and the color image can be recorded by the second recording means 3.

Accordingly, when record command is emitted from the controller, the sheet supply roller 11 is rotated in the direction shown by the arrow to separate and supply the recording sheets 6 one by one, and the separated recording sheet is temporarily stopped by a nip between the pair of regist rollers 13*a*, 13*b*. Immediately before or after the sheet supplying operation is started, the pre-rotation of the photosensitive drum 18 in the process cartridge of the first recording means 2 is effected. And, at the same time, the roller 36 is rotated to drive the belt 4. In this case, the charge is applied to the transfer roller 20 to permit the charging of the belt 4. The charged portion of the belt is shifted from the transfer roller 20 to the roller 14 through the roller 36. As soon as the charged portion of the belt 4 reaches the roller 14, the pair of regist rollers 13*a*, 13*b* is driven to convey the recording sheet. As a result, the absorption and conveyance of the recording sheet 6 are started in the vicinity of a nip between the roller 14 and the belt 5.

Due to the absorption, the recording sheet 6 being conveyed is directed to the photosensitive drum 18 of the first recording means 2 through the roller 16. In this case, the photosensitive drum 18 is continuously driven at a predetermined process speed in a condition that the toner image is not formed on the photosensitive drum by the developing means. Thus, the recording sheet 6 merely passes through the first recording means 2 without recording the image on the recording sheet.

Then, the recording sheet 6 is continuously conveyed in a condition that the recording sheet 6 is still being electrostatically absorbed to the belt 4 to reach the second recording means 3; meanwhile, a tip end of the recording sheet 6 is detected by a sheet sensor (not shown). On the basis of the detection, the recording sheet 6 is conveyed up to a record start position (regarding the recording sheet 6) below the recording head 32 of the second recording means 3 and is stopped there temporarily. Thereafter, at an appropriate timing, the carriage 29 is reciprocally shifted in the direction perpendicular to the recording sheet conveying direction to execute one-line main scan recording. After the one-line recording is finished, the belt 4 is intermittently driven to shift the recording sheet 6 by one step in the sub scan direction.

There is provided a spacing means (not shown) for spacing the recording sheet 6 together with the belt 4 apart from the first recording means 2 when the recording is effected by the second recording means 3. As an alternative method, the first recording means 2 may be shifted to separate it from the belt 4.

By the intermittent shifting of the belt 4 (sub-scan) and the reciprocal shifting of the carriage 29 (main scan), the image is gradually recorded on the recording sheet 6 by the second recording means 3, thereby obtaining the color image. Even after the tip end of the recording sheet 6 reaches an outer periphery of the drive roller 36, the recording sheet 6 is still conveyed along the periphery of the roller 36 due to the electrostatic absorption to a lower side 4*a* of the belt remote from the first and second recording means.

After the recording of the second recording means 3 is finished, when a trail end of the recording sheet leaves the recording head 32, the belt 4 is continuously driven again by the drive roller 36, with the result that the recording sheet 6 is conveyed to the first recording means 2 again through a periphery of the roller 37. In this case, the recording is executed by the first recording means 2, so that the toner is transferred onto the recording sheet 6 to record the mono-color image. Then, although the recording sheet reaches the second recording means 3, the recording is not executed by the second recording means 3, and the recording sheet merely passes through the second recording means (below the recording head 32).

Then, when the tip end of the recording sheet 6 reaches the separation corona charger 34, separation bias charge is applied to the recording sheet from the separation corona charger, with the result that the recording sheet 6 is separated from the belt 4 by the curvature of the periphery of the drive roller 36 and the separation pawl 35. The separated recording sheet is sent, through the pre-fixing guide 38, to the fixing device 39, where the toner is fixed to the sheet and at the same time the ink is dried by the heat roller 40 and the pressure roller 41. After the fixing operation is finished, the recording sheet 6 is discharged onto the stacker 52 through the pair of discharge rollers 44, 45, flapper 46, sheet guides 47*a*, 47*b* and curl correction rollers 49, 59, 51. In this case, the discharged recording sheet has thereon the mono-color image formed by the electrophotographic method and the color image formed by the ink jet method.

Even when the image information emitted from the controller includes the mono-color image data alone or the color image data alone, the recording is executed with the conveyance of the recording sheet as same as the aforementioned sheet conveyance. That is to say, when the image information includes the mono-color image data alone, only the recording of the first recording means 2 is executed to the recording sheet 6 shifted together with the belt 4; whereas, when the image information includes the color image data alone, only the recording of the second recording means 3 is executed to the recording sheet 6 shifted together with the belt 4. And, after the recording is finished, the recording sheet 6 is separated from the belt 4 by the separation corona charger 34 and the separation pawl 35, and then, the fixing is executed at the fixing device 39. In this way, the recording sheet 6 having the mono-color image alone or the color image alone is discharged onto the stacker 52.

In the first embodiment, while an example that the convey means commonly used with respect to the first and second recording means comprises the endless belt was explained, other convey means which can be commonly used with respect to the first and second recording means may be utilized. Further, a peripheral length of the endless belt is selected to be greater than a length (in the sheet conveying direction) of the available maximum recording sheet. By fixing the toner and the ink simultaneously after the recording operations of the first and second recording means are finished while using the common convey means, since the relative deviation between the images caused by the contraction of the recording sheet due to the heat of the fixing device can be prevented, the deviation between the image obtained by the first recording means 2 and the image obtained by the second recording means 3 can be minimized.

Further, the process speed of the first recording means comprised of the process cartridge of electrophotographic type is selected to be greater than an average process speed of the second recording means of full-color ink jet type. The reason is that, since the greater number of mono-color images are requested than the number of color images by the user or operator, by increasing the process speed of the mono-color recording means, the total recording time can be minimized.

Further, by arranging the first recording means of the upstream side of the second recording means and by executing the recording of the second recording means prior to the first recording means, a distance between the first and second recording means can be made smaller than the length (in the sheet conveying direction) of the recording sheet, thereby making the entire apparatus more compact.

(Second Embodiment)

Figure 2:
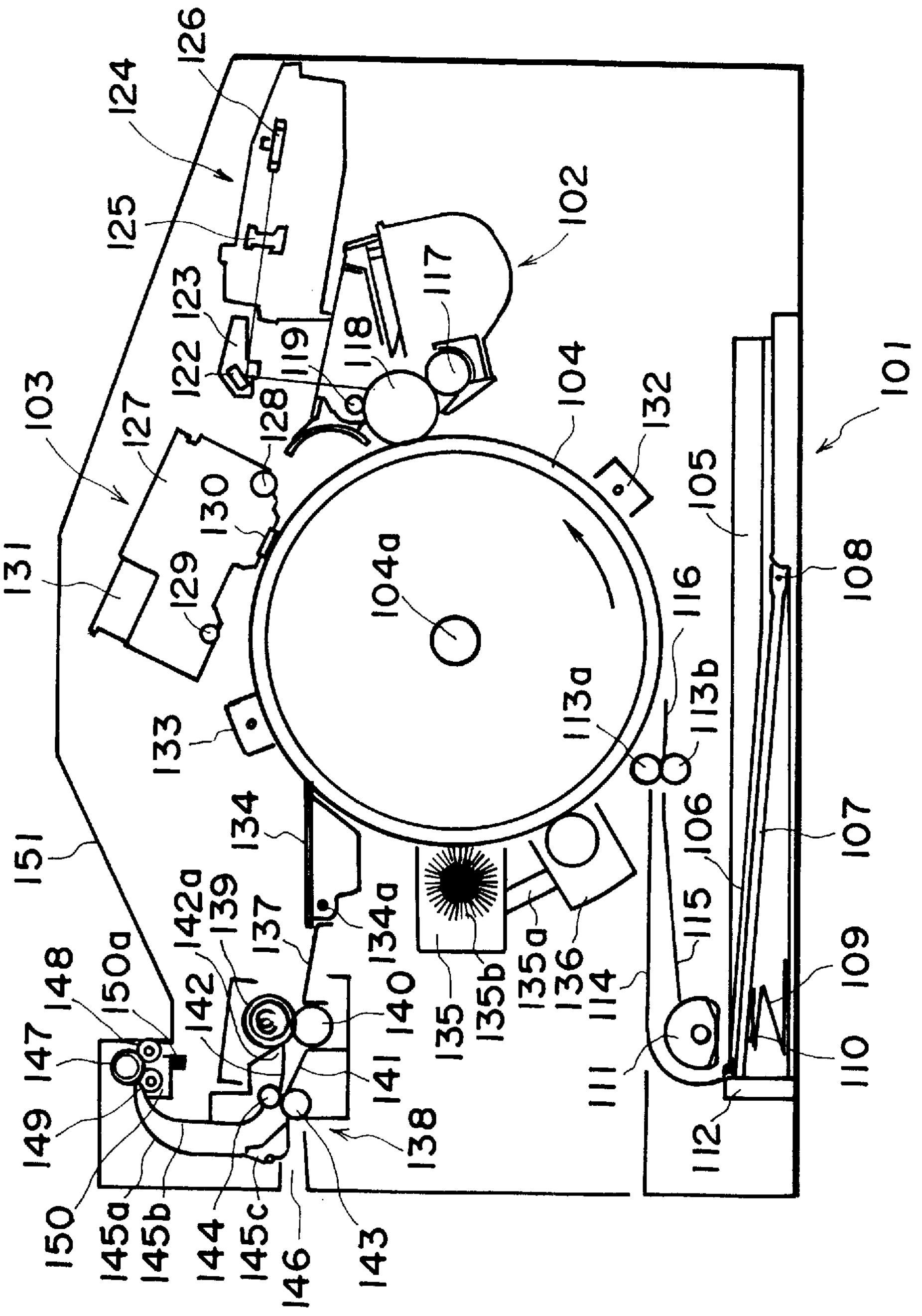
FIG. 2 is a schematic illustration showing an image forming apparatus according to a second embodiment of the present invention.

FIG. 2 is a schematic illustration showing an image forming apparatus according to a second embodiment of the present invention. In an image forming apparatus 101 according to the second embodiment, a transfer drum 104 for winding a recording sheet therearound and for conveying the recording sheet is used as a convey means (for the recording sheet) commonly used with respect to the first and second recording means. A recording sheet stack 106 contained in a sheet cassette 105 is biased upwardly by pressure springs 110 via a pressure plate 107 to be urged against a separation pawl 112, and the pressure plate 7 can be moved pivotally around bearings 108 in accordance with an amount of the recording sheets 106 rested on the plate. The pressure springs 110 are positioned by projections 109 formed on a lower surface of the pressure plate 107.

A semi-circular sheet supply roller 111 is disposed above the sheet cassette 105. When the sheet supply roller 111 is driven by a drive system (not shown) in a direction shown by the arrow in FIG. 2, the recording sheets 106 are fed out by the roller and are separated one by one by the separation pawl 112. The separated recording sheet 106 is guided by sheet guides 114, 115 to reach a nip between a pair of regist rollers 113*a*, 113*b* and is stopped there temporarily.

The transfer drum 104 has an outer peripheral surface formed from material having an electrically intermediate resistance value, and a central bearing portion 104*a*. The transfer drum is connected to a drive system (not shown). Around the transfer roller 104, there are disposed (in order along a rotational direction of the drum shown by the arrow) the pair of regist rollers 113*a*, 113*b*, a corona charger 132, a first recording means 102 comprised of a process cartridge of electrophotographic type, a second recording means 103 of ink jet type, a separation corona charger 133, a separation pawl 134, a cleaning device 135, and an electricity removing roller 136.

The first recording means 102 includes a photosensitive drum 118, a first charger roller 119, a developing sleeve 117, toner and a toner agitating mechanism (not shown), and a cleaning blade and a waste toner container for removing residual toner remaining on the photosensitive drum. And, alteration thereof is the same as the above-mentioned first embodiment.

The exposure to the photosensitive drum 118 is effected by means of a scanner 124. The scanner 124 includes a polygon mirror 126 rotated by a motor (not shown) so that a laser beam emitted from a laser unit including a semiconductor laser (not shown) is directed to the photosensitive drum by the polygon mirror. The laser beam is corrected by an fθ lens 125 so that a length of a light path becomes constant, and the laser beam is incident on the photosensitive drum 118 through a mirror 122 secured to the holder 123.

Next, the second recording means 103 comprised of the ink jet recording portions of full-color type will be explained.

The ink jet recording portion includes a carriage 127 on which a recording head 130 and ink tanks 131 are mounted. The carriage is supported by two rails 128, 129 for movement in a direction perpendicular to a recording sheet conveying direction. The ink tanks 131 contain cyan color ink, magenta color ink, yellow color ink and black color ink, respectively, and each ink tank can be exchanged by a new one independently. Accordingly, the recording head 130 is divided into four head portions corresponding to four colors and serves to record the image on the recording sheet 106 in a non-contact manner.

Further, there is provided a recovery means (not shown) for the recording head 130.

With the arrangement as mentioned above, the recording sheet 106 on which the images were recorded is separated from the transfer drum by the separation charger 133 and the separation pawl 134, and the separated recording sheet is sent to a fixing device 138 through a pre-fixing guide 137. The fixing device 138 comprises a heat roller 130 including a heater therein, and a pressure roller 140. With this arrangement, the ink and the toner on the recording sheet 106 are thermally fixed to the sheet simultaneously at a nip between the rollers 139, 140. The pressure roller 140 is urged against the heat roller 139 by a spring (not shown).

Guides 141, 142 are disposed at a downstream side of the pair of heat and pressure rollers 139, 140 of the fixing device 138. The recording sheet leaves the fixing device and is discharged toward a downstream side by a pair of discharge rollers 143, 144 while being guided by the guides 141, 142. The guide 142 also acts as a separation pawl 142*a*. The recording sheet is directed to curl correction rollers 147, 149, 148 by a flapper 145*c* and guides 145*a*, 145*b*. The curl correction rollers 149, 148 are mounted on a holder 150 which is biased toward the curl correction roller 147 by a spring 150*a* to permit the curl correction of the recording sheet 106.

The recording sheet 106 discharged from the curl correction means is discharged onto a stacker 151 defined on an upper surface of the apparatus with the imaged surface facing downwardly (face-down). When a thick sheet which is hard to be guided by the guides 145*a*, 145*b* after the fixing operation is used, the flapper 145*c* is rotated in an anti-clockwise direction in FIG. 2 so that the thick sheet can be discharged through a discharge opening 146 with the imaged surface facing upwardly (face-up).

Next, an actual operation of the second embodiment having the above arrangement will be explained.

As is in the first embodiment, the image forming apparatus 101 is constituted as a printer connected to a computer or an original reading scanner so that color image data from the computer or the original reading scanner is color-decomposed by a controller into a color image and a mono-color (black/white) image such as characters. With this arrangement, the mono-color image can be recorded by the first recording means 102 and the color image can be recorded by the second recording means 103.

Accordingly, when record command is emitted from the controller, the sheet supply roller 111 is rotated in the direction shown by the arrow to separate and supply the recording sheets 106 one by one, and the separated recording sheet is temporarily stopped by a nip between the pair of regist rollers 113*a*, 113*b*. Immediately before or after the sheet supplying operation is started, the pre-rotation of the photosensitive drum 118 in the process cartridge of the first recording means 102 is effected. And, at the same time, the transfer drum 104 is rotated. In this case, the charge is applied to the corona charger 132 to permit the charging of the transfer drum 104. The charged portion of the transfer drum is rotated from the position of the corona charger 132 by about one revolution. As soon as the charged portion of the transfer drum is rotated by about one revolution, the pair of regist rollers 113*a*, 113*b* is driven to convey the recording sheet. As a result, the absorption or attraction of the recording sheet 106 is started immediately behind the sheet guide 116, thereby conveying the recording sheet by the rotation of the transfer drum 104.

Due to the absorption, the recording sheet 106 being conveyed is directed to a nip between the transfer drum and the photosensitive drum 118 of the first recording means 102. In this case, the photosensitive drum 118 is continuously driven at a predetermined process speed in a condition that the toner image is not formed on the photosensitive drum by the developing means. Thus, the recording sheet 106 merely passes through the first recording means 102 without recording the image on the recording sheet.

Then, the recording sheet 106 is continuously conveyed in a condition that the recording sheet 106 is still being electrostatically absorbed to the transfer drum 104 to reach the second recording means 103; meanwhile, a tip end of the recording sheet 106 is detected by a sheet sensor (not shown). On the basis of the detection, the recording sheet 106 is conveyed up to a record start position (regarding the recording sheet 106) below the recording head 130 of the second recording means 103 and is stopped there temporarily. Thereafter, at an appropriate timing, the carriage 127 is reciprocally shifted in the direction perpendicular to the recording sheet conveying direction to execute one-line main scan recording. After the one-line recording is finished, the transfer drum 104 is intermittently driven to shift the recording sheet 106 by one step in the sub scan direction.

There is provided a spacing means (not shown) for spacing the first recording means 102 together with the process cartridge apart from the recording sheet 106 when the recording is effected by the second recording means 103.

By the intermittent shifting of the transfer drum 104 (sub-scan) and the reciprocal shifting of the carriage 127 (main scan), the image is gradually recorded on the recording sheet 106 by the second recording means 103, thereby obtaining the color image. Then, the tip end of the recording sheet 106 passes below the separation corona charger 133. In this case, the separation corona is not generated by the separation corona charger 133. The tip end of the recording sheet 106 is further conveyed to reach the separation pawl 134. The separation pawl 134 is slightly spaced apart from the surface of the transfer drum 104 with a small gap therebetween. Thus, the recording sheet 106 is passed through below the separation pawl 134 toward the cleaning device 135. The cleaning device 135 and the downstream electricity removing roller 136 are incorporated into a single frame 135*a* which is retracted from the surface of the transfer drum 104 by a small distance during the recording operation. Thus, in this case, the recording sheet 106 does not contact with the cleaning device 135.

After the recording of the second recording means 103 of ink jet type is finished, when a trail end of the recording sheet leaves the recording head 130, the transfer drum 104 is continuously driven again, with the result that the recording sheet 106 is conveyed to the first recording means 102 again. In this case, the recording is executed by the first recording means 102, so that the toner is transferred onto the recording sheet 106 to record the mono-color image. Then, although the recording sheet 106 reaches the second recording means 103 again, the recording is not executed by the second recording means 103, and the recording sheet merely passes through the second recording means (below the recording head 130).

Then, when the tip end of the recording sheet 106 reaches the separation corona charger 133, separation bias charge is applied to the recording sheet from the separation corona charger, and the separation pawl 134 is rotated around the bearing portion 134*a* to contact with the transfer drum 104. As a result, the recording sheet is separated from the transfer drum 104. The separated recording sheet is sent, through the pre-fixing guide 137, to the fixing device 138, where the toner is fixed to the sheet and at the same time the ink is dried by the heat roller 139 and the pressure roller 140. After the fixing operation is finished, the recording sheet 106 is discharged onto the stacker 151 through the pair of discharge rollers 143, 144, flapper 145*c*, sheet guides 145*a*, 145*b* and curl correction rollers 147, 148, 149. In this case, the discharged recording sheet 106 has thereon the mono-color image formed by the electrophotographic method and the color image formed by the ink jet method.

Even when the image information emitted from the controller includes the mono-color image data alone or the color image data alone, the recording is executed with the conveyance of the recording sheet as same as the aforementioned sheet conveyance. That is to say, when the image information includes the mono-color image data alone, only the recording of the first recording means 102 is executed; whereas, when the image information includes the color image data alone, only the recording of the second recording means 103 is executed.

After the recording is finished, the cleaning device 135 and the electricity removing roller 136 are shifted from the retarded position to contact with the surface of the transfer drum 104. By driving a brush roller 135*b* of the cleaning device 135 and the electricity removing roller 134 and by driving the transfer drum 104, the cleaning and electricity removal regarding the transfer drum 104 are effected, thereby preventing a next recording sheet from being smudged by the transfer drum.

In the second embodiment, while an example that the convey means commonly used with respect to the first and second recording means comprises the transfer drum was explained, other convey means which can be commonly used with respect to the first and second recording means may be utilized. Further, a peripheral length of the transfer drum is selected to be greater than a length (in the sheet conveying direction) of the available maximum recording sheet. By fixing the toner and the ink simultaneously after the recording operations of the first and second recording means are finished while using the common convey means, since the relative deviation between the images caused by the contraction of the recording sheet due to the heat of the fixing device can be prevented, the deviation between the image obtained by the first recording means and the image obtained by the second recording means can be minimized.

Further, the process speed of the first recording means comprised of the process cartridge of electrophotographic type is selected to be greater than an average process speed of the second recording means of full-color ink jet type. The reason is that, since the greater number of mono-color images are requested than the number of color images by the user or operator, by increasing the process speed of the mono-color recording means, the total recording time can be minimized.

(Third Embodiment)

Figure 3:
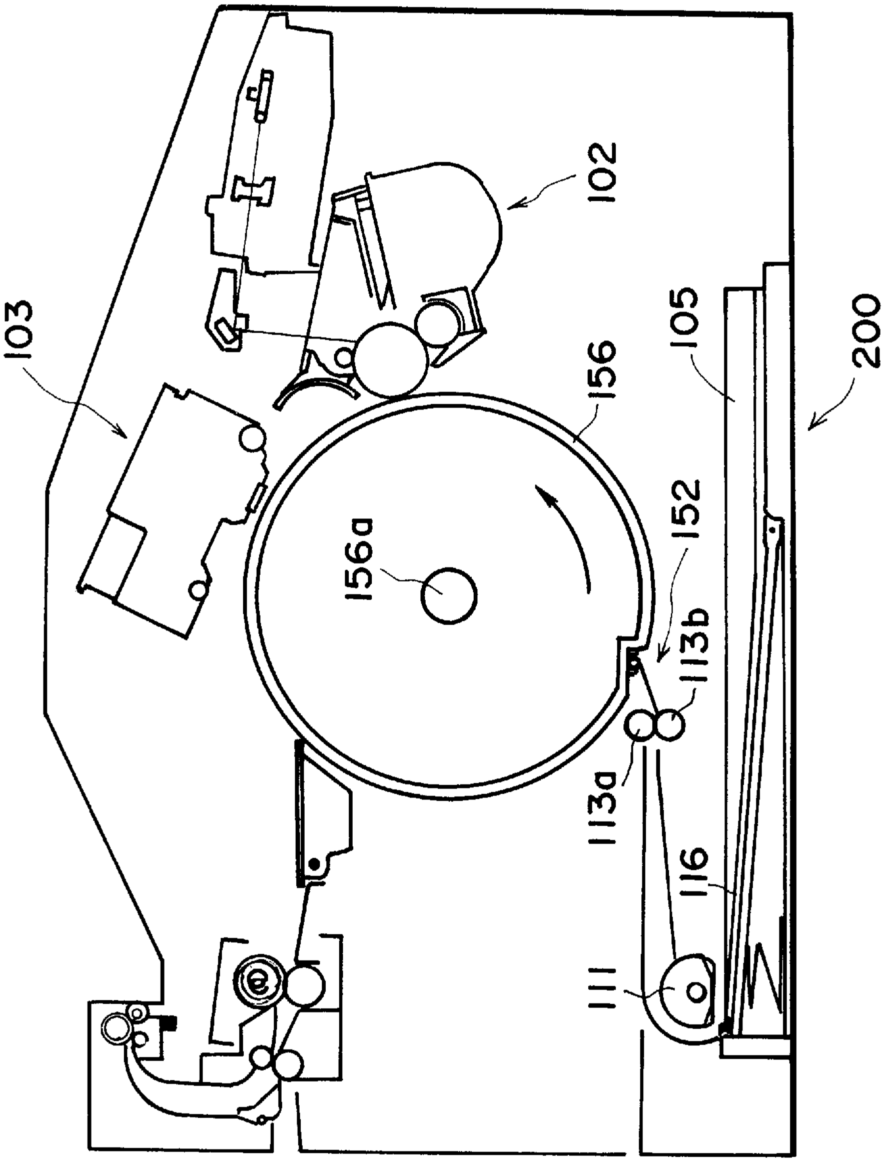
FIG. 3 is a schematic illustration showing an image forming apparatus according to a third embodiment of the present invention.

FIG. 3 is a schematic illustration showing an image forming apparatus according to a third embodiment of the present invention.

In an image forming apparatus 200 according to the third embodiment, a transfer drum 156 for winding a recording sheet therearound and for conveying the recording sheet is used as a convey means (for the recording sheet) commonly used with respect to the first and second recording means, and the conveyance of the recording sheet and the recording sequence of the first and second recording means are the same as those in the image forming apparatus 101 according to the second embodiment. The feature of the third embodiment (different from the second embodiment) is that a gripper 152 is used in association with the transfer drum 156.

Incidentally, only the elements required to be explained are designated by the reference numerals, and the elements which are not numbered and the elements designated by the same reference numeral as the second embodiment (FIG. 2) are the same as those in the second embodiment.

The image forming apparatus 200 according to the third embodiment includes the transfer drum 156, and the gripper 152 disposed on the surface of the transfer drum and adapted to clamp the recording sheet 106. The process for supplying the recording sheet 106 from the sheet cassette 105 by means of the sheet supply roller 111 and for conveying the recording sheet to the transfer drum 156 by means of the pair of regist rollers 113*a*, 113*b* is the same as the second embodiment.

Thereafter, the recording sheet 106 is clamped to the surface of the transfer drum 156 by the gripper 152. Then, when the transfer drum 156 is rotated around bearing portions 156*a* in a direction shown by the arrow in FIG. 3, the recording sheet is conveyed to the first and second recording means 102, 103. Further recording sequence and recording method are the same as the second embodiment.

Figure 4:
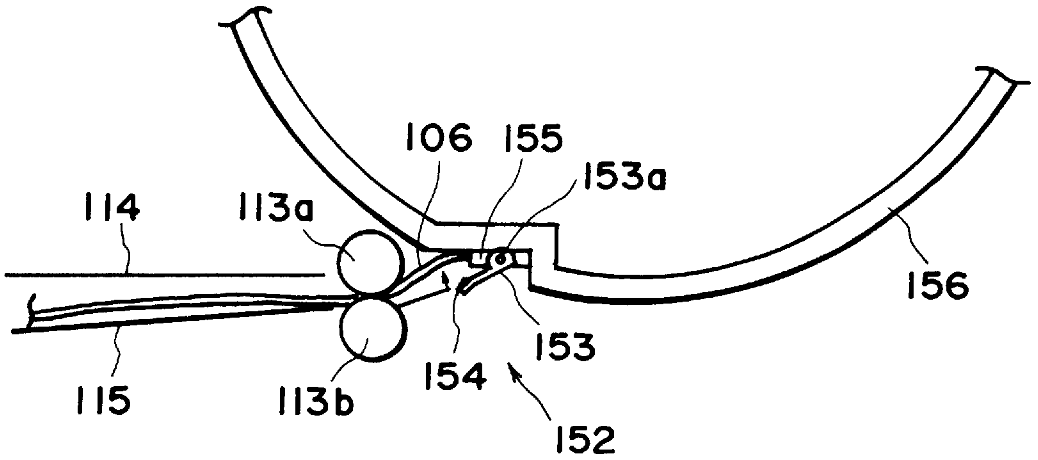
FIGS. 4 and 5 are partial enlarged views of the image forming apparatus according to the third embodiment.
Figure 5:
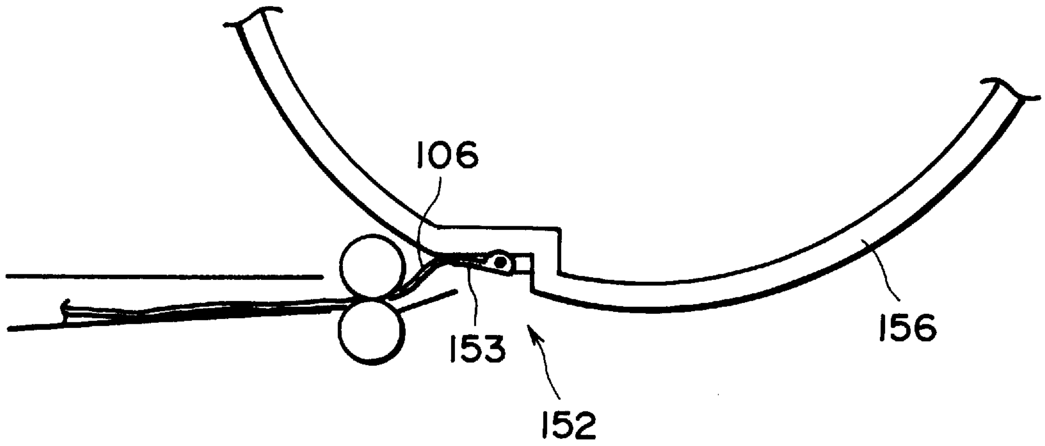

FIGS. 4 and 5 are enlarged views of the gripper 152.

In FIG. 4, after the supplied recording sheet 106 reaches the nip between the regist rollers 113*a*, 113*b* while being guided by the sheet guides 114, 115, by driving the pair of regist rollers 113*a*, 113*b*, the recording sheet 106 is further conveyed to abut against a projection 155, thereby forming a small loop in the recording sheet. In this condition, the pair of regist rollers 113*a*, 113*b* are stopped temporarily (FIG. 4). Thereafter, a clamp arm 153 of the gripper 152 is rotated around a fulcrum 153*a* in a direction shown by the arrow to clamp the recording sheet 106, as shown in FIG. 5. The clamp arm 153 is provided at its tip end with a rubber pad 154 for providing a clamping force (due to a friction force of the pad). Although a mechanism for rotating the clamp arm 153 is not shown, for example, a simple actuator such as a solenoid for controlling the rotation may be provided within the transfer drum 156.

Figure 6:
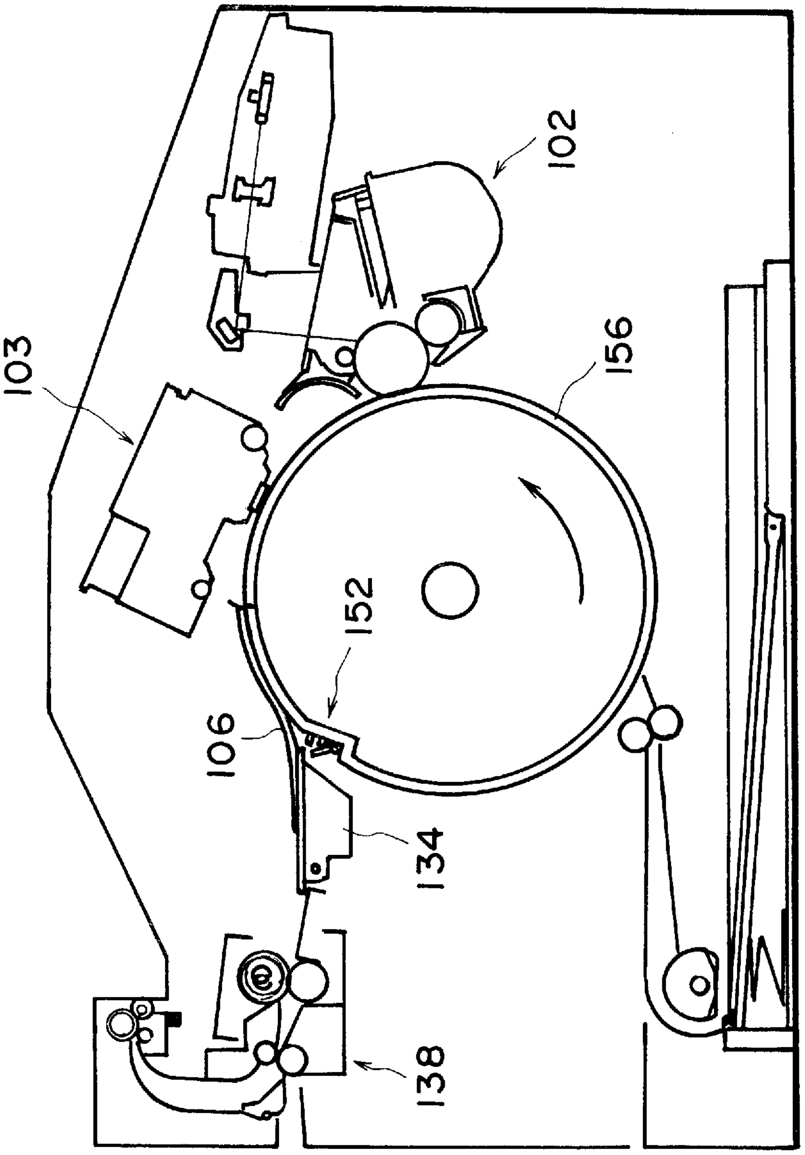
FIG. 6 is another schematic illustration showing the image forming apparatus according to the third embodiment.
Figure 7:
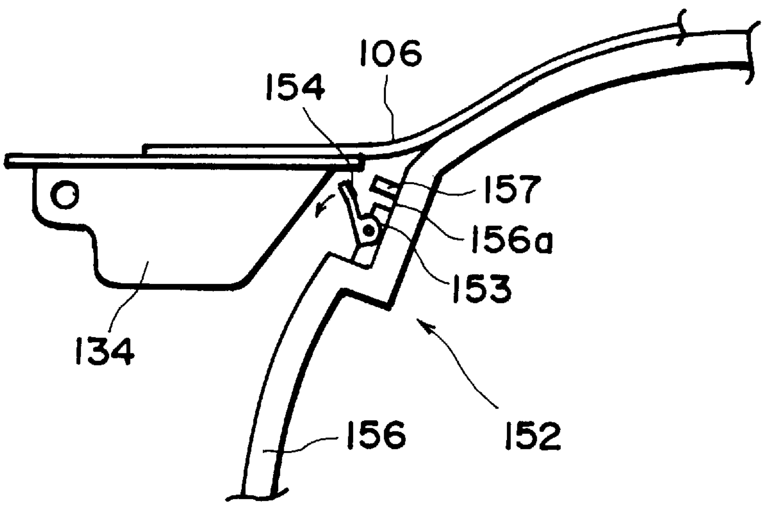
FIG. 7 is a partial enlarged view of the image forming apparatus of FIG. 6.

FIG. 6 shows a condition that the recording sheet 106 is separated from the transfer drum 156 by the separation pawl 134 to convey the recording sheet 106 to the fixing device 139 after the recording operations of the first and second recording means are finished. FIG. 7 is an enlarged view of the gripper 152 in this condition.

In FIG. 7, the clamp arm 153 is rotated in a direction shown by the arrow to release the recording sheet 106, and, at the same time, a pin 157 is protruded from a flat portion 156*a* of the transfer drum 156. As a result, the recording sheet 106 is apt to be separated. The rotation timing of the transfer drum 156 is selected so that the tip end of the recording sheet reaches the separation pawl 134 after the pin is protruded. The protruding movement of the pin 157 is controlled by a simple actuator such as a solenoid provided within the transfer drum 156.

In the third embodiment, since there is no electrostatic absorption means as is in the second embodiment, the corona charger, separation corona charger, cleaning device and electricity removing roller associated with the electrostatic absorption means can be omitted. (However, it is necessary to provide the transfer charger used in the first recording means.) Accordingly, the number of high voltage circuits for the chargers and the number of parts can be reduced, thereby making the entire apparatus cheaper.

Further, even when any other appropriate gripper means for clamping the recording sheet to the transfer drum other than the above-mentioned gripper is used, the same advantage can be achieved.

(Fourth Embodiment)

Figure 8:
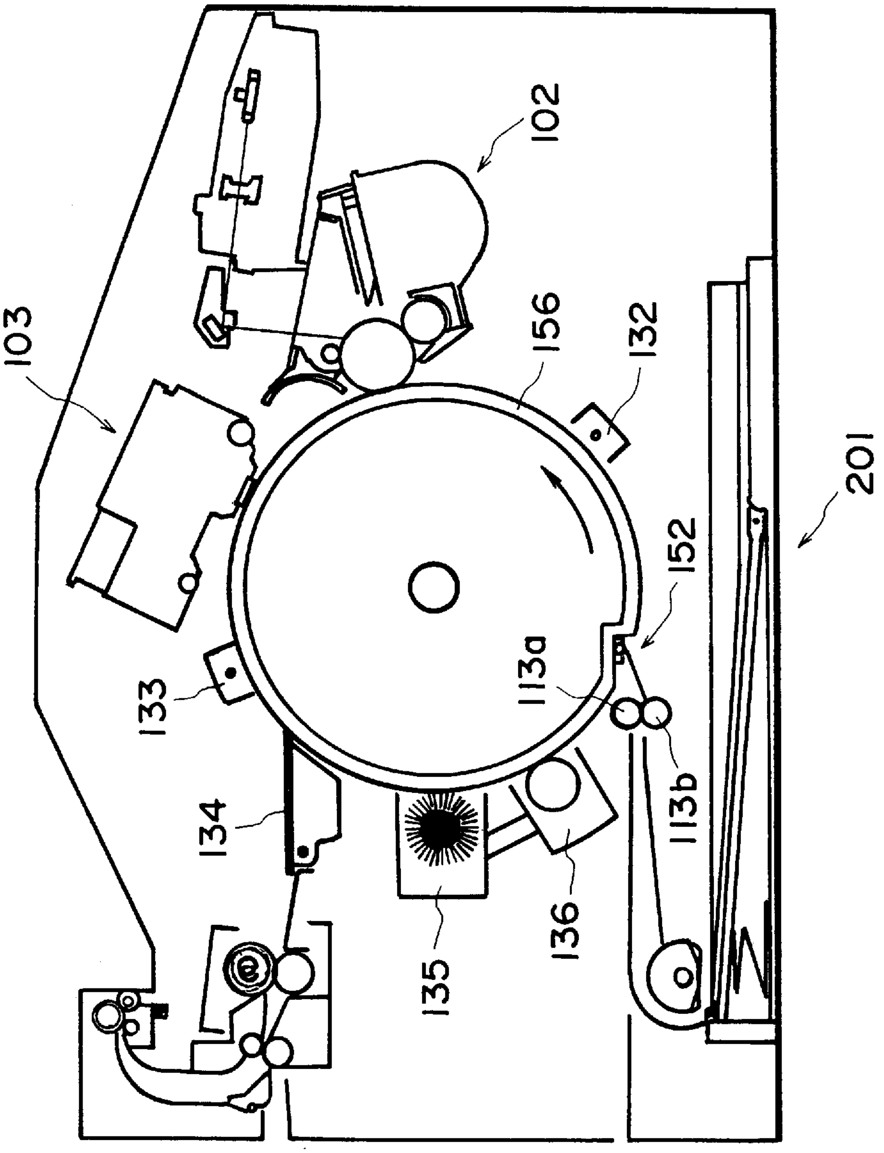
FIG. 8 is a schematic illustration showing an image forming apparatus according to a fourth embodiment of the present invention.

FIG. 8 shows an image forming apparatus 201 according to a fourth embodiment of the present invention. This image forming apparatus includes both the electrostatic absorption means of the second embodiment and the gripper of the third embodiment.

Around the transfer drum 156, there are disposed (in order along a rotational direction of the drum shown by the arrow) a pair of regist rollers 113*a*, 113*b*, a corona charger 132, a first recording means 102, a second recording means 103, a separation corona charger 133, a separation pawl 134, a cleaning device 135, and an electricity removing roller 136. These elements are the same as those in the second embodiment. Further, there is also provided a gripper 152 same as that in the third embodiment. The surface of the transfer drum 156 is constituted by material having an electrically intermediate resistance value, as is in the second embodiment.

Accordingly, in this fourth embodiment, by using the gripper and the electrostatic absorption means, for example, a thick sheet having great resiliency can be conveyed more positively, and, since the conveying ability is stabilized regardless of change in environmental condition, the deviation between the images formed by the first and second recording means can be prevented effectively, thereby achieving higher recording accuracy.

(Fifth Embodiment)

Figure 9:
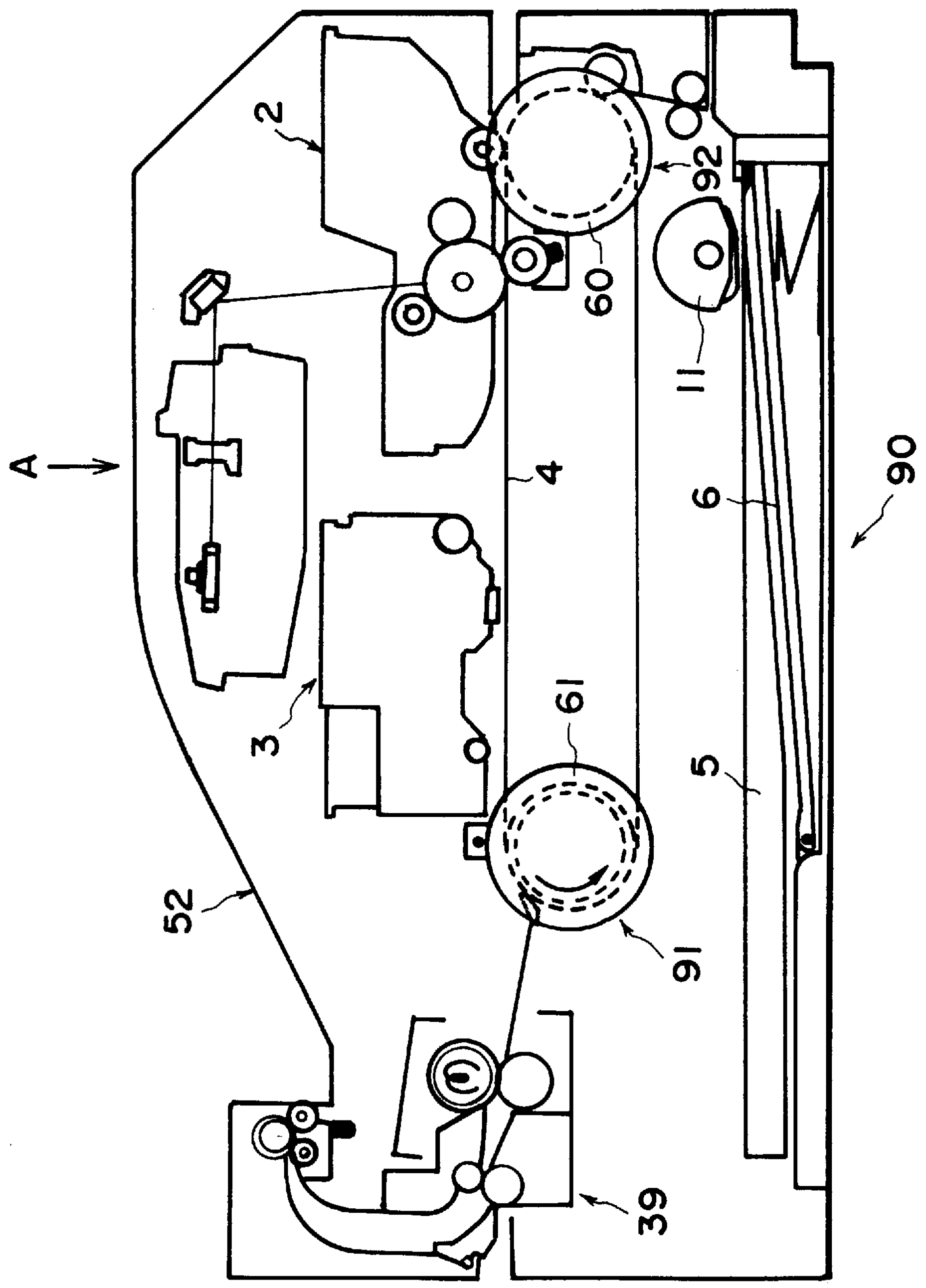
FIG. 9 is a schematic illustration showing an image forming apparatus according to a fifth embodiment of the present invention.

FIG. 9 is a schematic illustration showing an image forming apparatus according to a fifth embodiment of the present invention.

In an image forming apparatus 90 according to the fifth embodiment, a belt 4 for electrically absorbing and conveying the recording sheet is used as a convey means (for the recording sheet) commonly used with respect to the first and second recording means 2, 3. The conveyance of the recording sheet and the recording sequence of the first and second recording means are the same as those in the image forming apparatus 1 according to the first embodiment. The image forming apparatus 90 differs from the image forming apparatus 1 in the point that there is provided a regulating means or correction means for regulating or preventing the belt 4 from being shifted in a longitudinal direction of the rollers for driving the belt (i.e., in a direction transverse to the recording sheet conveying direction).

More particularly, in the illustrated embodiment, the correction means is constituted by tapered annular ribs 61, 62 formed on at least one end of each roller to prevent the belt 4 from being shifted in the longitudinal direction of the rollers.

Incidentally, only the elements required to be explained are designated by the reference numerals, and the elements which are not numbered and the elements designated by the same reference numeral as the first embodiment (FIG. 1) are the same as those in the first embodiment.

This embodiment differs from the first embodiment only in the point that the shapes of the ends of the drive roller 36 and the driven roller 37 are changed from those in the first embodiment. The functions and configurations of the other elements are the same as those of the first embodiment. Accordingly, the recording sheet 6 in the sheet cassette 5 is supplied by the sheet supply roller 11, and the supplied sheet is absorbed to the endless belt 4 and conveyed thereby. In the first process, the recording sheet merely passes through the first recording means 2, and, in the second recording means 3, the recording is firstly executed on the recording sheet. Then, the recording sheet 6 is conveyed, by the endless belt 4, to the first recording means 2 again, where the recording is executed to form the composite image. Thereafter, the recording sheet is sent to the fixing device 39, where the toner and the ink are thermally fixed to the sheet simultaneously. Then, the recording sheet is discharged onto the stacker 52 by the sheet discharge means. Other than the shapes of the ends of the rollers 36, 37, the third embodiment is the same as the first embodiment.

Next, the shapes of the ends and function of the rollers 36, 37 will be explained.

Figure 10:
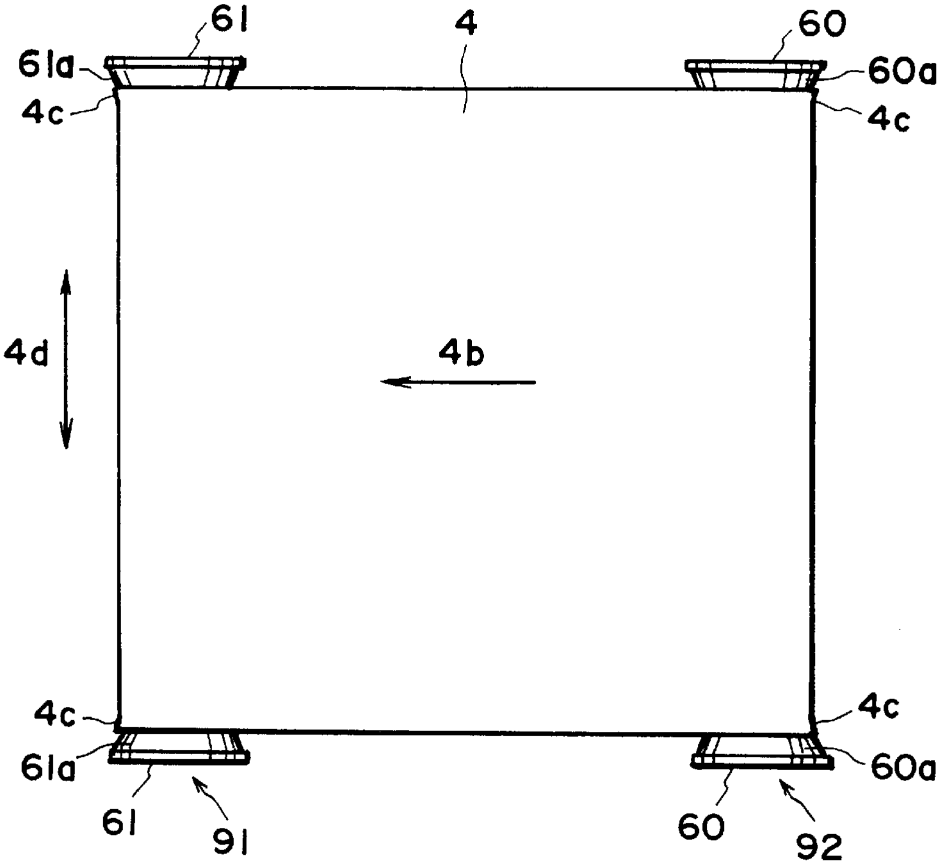
FIG. 10 is an enlarged plan view of a convey means viewed from a direction shown by the arrow A in FIG. 9.

In FIG. 10, which is a view viewed from a direction shown by the arrow A in FIG. 9, the arrow 4*b* on the belt 4 indicates the recording sheet conveying direction.

A roller 91 corresponding to the drive roller 36 of the first embodiment is provided at its both ends with tapered annular ribs 61. The tapered ribs 61 have respective tapered surfaces 61*a* on which edge portions of the endless belt 4 ride. As a result, the edge portions of the endless belt 4 are elastically deformed (deformed portions 4*c*). A roller 92 corresponding to the driven roller 37 of the first embodiment is provided at its both ends with tapered annular ribs 60. The tapered ribs 60 have respective tapered surfaces 60*a* on which edge portions of the endless belt 4 ride. As a result, the edge portions of the endless belt 4 are elastically deformed (deformed portions 4*c*).

With the arrangement as mentioned above, when the drive roller 91 is rotated to drive the endless belt 4, a shifting amount of the belt 4 in directions shown by the double-headed arrow 4*d* can be minimized by the tapered surfaces 61*a*, 60*a*, thereby preventing the deterioration of recording accuracy.

The tapered ribs may be provided on at least one of the rollers 91, 92. Further, the tapered rib may be provided on one end of one of the rollers. Incidentally, in the fifth embodiment, while an example that an edge portion or edge portions of the endless belt is deformed in a concave fashion by the tapered rib or ribs to prevent the belt from shifting in the directions 4*d* was explained, a crown (central larger diameter portion) may be formed on at least one of the rollers to elastically deform the endless belt in a convex fashion. Also in this case, the same advantage can be anticipated.

(Sixth Embodiment)

Figure 11:
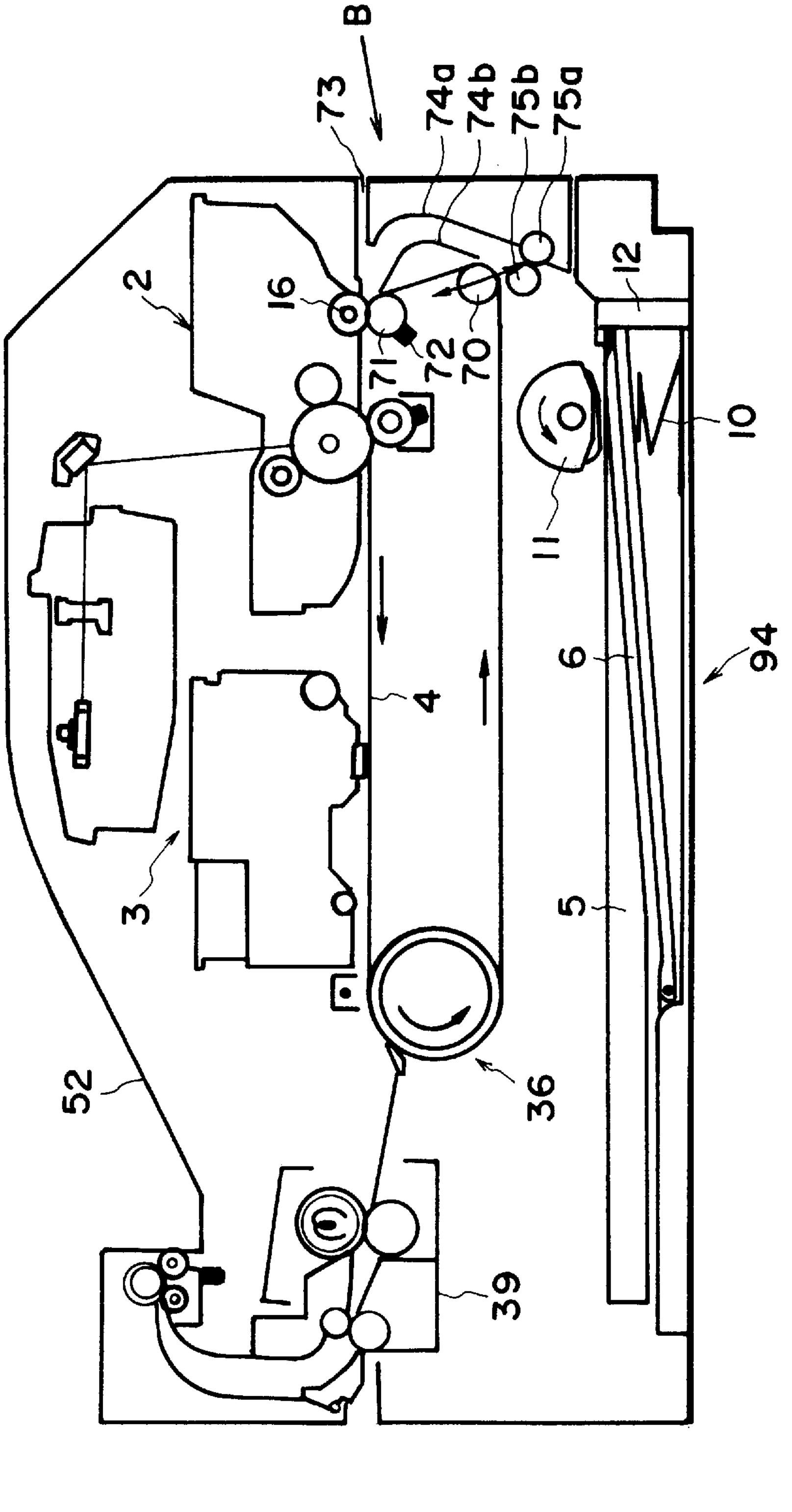
FIG. 11 is a schematic illustration showing an image forming apparatus according to a sixth embodiment of the present invention.

FIG. 11 shows an image forming apparatus 94 according to a sixth embodiment of the present invention.

In the image forming apparatus 94 according to the sixth embodiment, a belt 4 for electrically absorbing and conveying the recording sheet is used as a convey means (for the recording sheet) commonly used with respect to the first and second recording means 2, 3. The conveyance of the recording sheet and the recording sequence of the first and second recording means are the same as those in the image forming apparatus according to the first embodiment. The image forming apparatus 94 differs from the image forming apparatus 1 in the point that there is provided a regulating means or correction means for regulating or preventing the belt 4 from being shifted in a longitudinal direction of the rollers for driving the belt (i.e., in a direction transverse to the recording sheet conveying direction), similar to the fifth embodiment.

However, in the sixth embodiment, the correction means comprises at least one additional roller for regulating or preventing the belt 4 from being shifted in the longitudinal direction of the rollers for driving the belt. Incidentally, in FIG. 11, only the elements required to be explained are designated by the reference numerals, and the elements which are not numbered and the elements designated by the same reference numeral as the first embodiment (FIG. 1) are the same as those in the first embodiment.

More specifically, the sixth embodiment differs from the first and fifth embodiments, only regarding a driving mechanism for driving the endless belt 4. However, the drive roller 36 is used as it is. Further, the configurations and functions of the other elements of the apparatus are the same as those of the first embodiment. Accordingly, the recording sheet 6 in the sheet cassette 5 is supplied by the sheet supply roller 11, and the supplied sheet is absorbed to the endless belt 4 and conveyed thereby. In the first process, the recording sheet merely passes through the first recording means 2, and, in the second recording means 3, the recording is firstly executed to the recording sheet. Then, the recording sheet 6 is conveyed, by the endless belt 4, to the first recording means 2 again, where the recording is executed to form the composite image. Thereafter, the recording sheet is sent to the fixing device 39, where the toner and the ink are thermally fixed to the sheet simultaneously. Then, the recording sheet is discharged onto the stacker 52 by the sheet discharge means. Other than the driving system for driving the endless belt 4, the sixth embodiment is the same as the first embodiment.

Next, the driving system for driving the endless belt 4 according to the sixth embodiment will be fully explained.

In FIG. 11, the recording sheets 6 in the sheet cassette 5 are supplied by the sheet supply roller 11 and are separated one by one by the separation pawl 12. The separated recording sheet is urged against the nip between a pair of regist rollers 75*a*, 75*b* and then a loop is formed in the recording sheet. In this condition, the recording sheet is stopped temporarily. In this way, the skew-feed of the sheet is corrected. Thereafter, the pair of regist rollers 75*a*, 75*b* are driven by a drive system (not shown) to convey the recording sheet to a nip between the roller 16 and the endless belt 4 while being guided by sheet guides 74*a*, 74*b*. Incidentally, the reference numeral 73 denotes a manual sheet insertion opening.

The endless belt 4 is supported by the drive roller 36 (same as the first embodiment) and two rollers 70, 71. The roller 71 is supported by a support means for translation movement and acts as a tensioner for the endless belt 4. By biasing bearing portions of the roller 71 rightwardly and upwardly by coil springs 72, tension is applied to the belt 4. The roller 70 (correction means) serves to regulate or prevent the endless belt 4 from shifting in a direction perpendicular to the recording sheet conveying direction. To this end, the roller can be swung around its one end in directions shown by the double-headed arrow.

Figure 12:
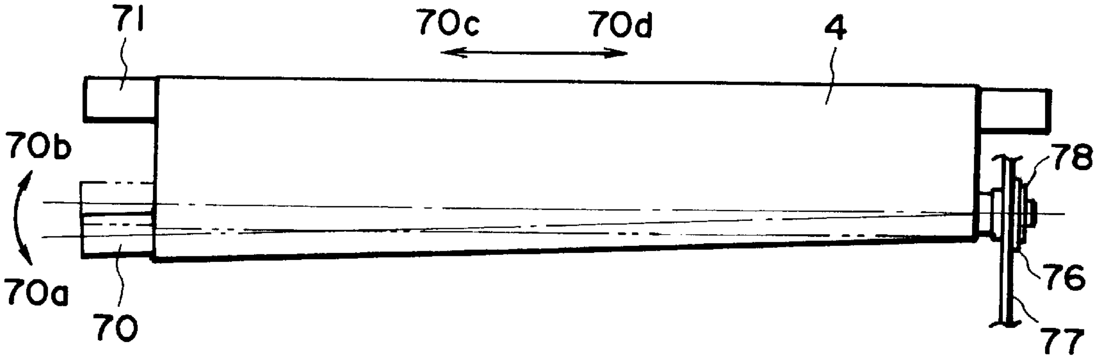
FIG. 12 is an enlarged plan view of a convey means viewed at from a direction shown by the arrow B in FIG. 11.

FIG. 12 is a view looked at from a direction shown by the arrow B in FIG. 11. The tension roller 71 is supported by the coil springs 72 (FIG. 11) and the bearing portions. The correction roller 70 has a bearing portion 76 loosely fitted to a chassis 77 and held by a holding ring such as an E-ring 78. The other end of the correction roller 70 is supported by a bearing (not shown) which can be rocked around the bearing portion 76 in directions shown by the arrow heads 70*a*, 70*b* by means of a lever mechanism using a simple actuator such as a solenoid.

When the roller 70 is rocked in the direction 70*a* by the actuator, the endless belt 4 is shifted in a direction 70*d*; whereas, when the roller 70 is rocked in the direction 70*b*, the endless belt 4 is shifted in a direction 70*c*. And, by using an optical sensor (not shown), a lateral position of the belt 4 is controlled in association with the correction roller 70. The rollers 70, 71 are made of metal. However, these rollers may be made of resin material having adequate rigidity.

When the position of the endless belt 4 is controlled by using the above-mentioned means, by appropriately setting or selecting a control target value, the deviation between the images obtained by the first and second recording means can be suppressed within an allowable range, thereby achieving the stable recording.

(Seventh Embodiment)

Figure 13:
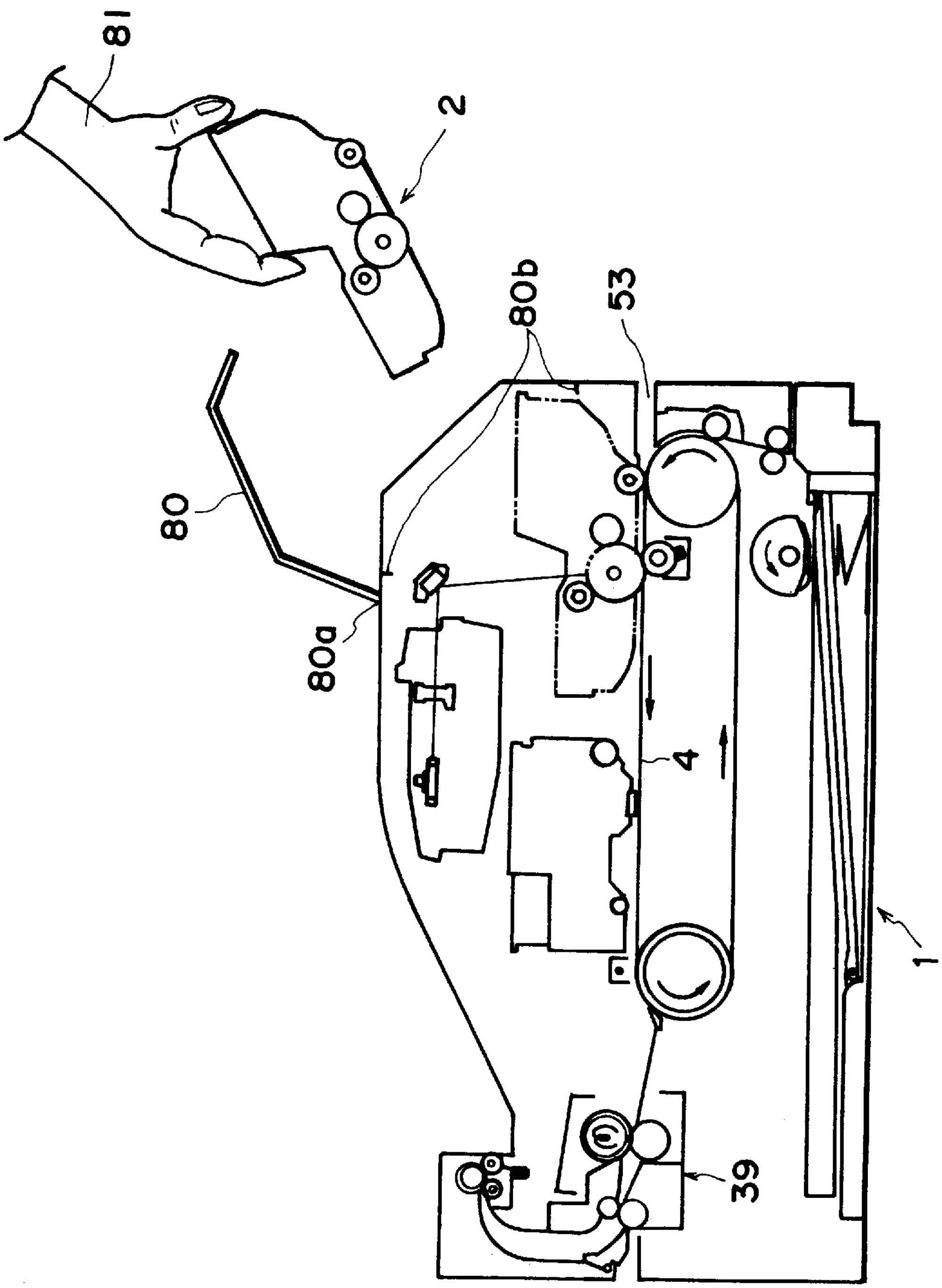
FIG. 13 is a schematic illustration showing an image forming apparatus according to a seventh embodiment of the present invention.

FIG. 13 shows a seventh embodiment of the present invention. In this embodiment, an opening 80*b* is formed on an outer surface of the image forming apparatus 1 of the first embodiment, and there is additionally provided a door 80 for closing and opening the opening 80*b*. The door 80 is pivotally mounted to the apparatus via a fulcrum 80*a*. When the door 80 is opened, the first recording means 2 comprised of the process cartridge (positioned in a phantom line position) can be removed from the apparatus by an operator's hand 81, as shown.

With this arrangement, since the entire first recording means 2 which is the electrophotographic cartridge can easily be dismounted from the image forming apparatus having the first and second recording means, the toner and the photosensitive drum can easily be exchanged by the operator, thereby achieving so-called "maintenance-free operation".

While this embodiment was explained in connection with the image forming apparatus 1 of the first embodiment, this embodiment can be applied to the image forming apparatuses 101, 200, 201, 90, 94 according to the second to sixth embodiments.

Further, in the above-mentioned first to seventh embodiments, when the first recording means is constituted by the process cartridge, guide members for guiding the process cartridge in a direction perpendicular to the plane of FIG. 13 may be provided within the apparatus so that the process cartridge can be dismounted from and mounted to the image forming apparatus along the direction perpendicular to the plane of FIG. 13. Furthermore, the entire apparatus may be divided into upper and lower halves with respect to the endless belt 4 so that the first and second recording means 2, 3 can be separated from the belt 4. In this case, two halves may be pivotally interconnected in the vicinity of the manual insertion opening 53 so that the side of the fixing device 39 can be widely opened. In this case, the fixing device itself may be divided or the fixing device may be shifted upwardly or downwardly.

(Eighth Embodiment)

Figure 14:
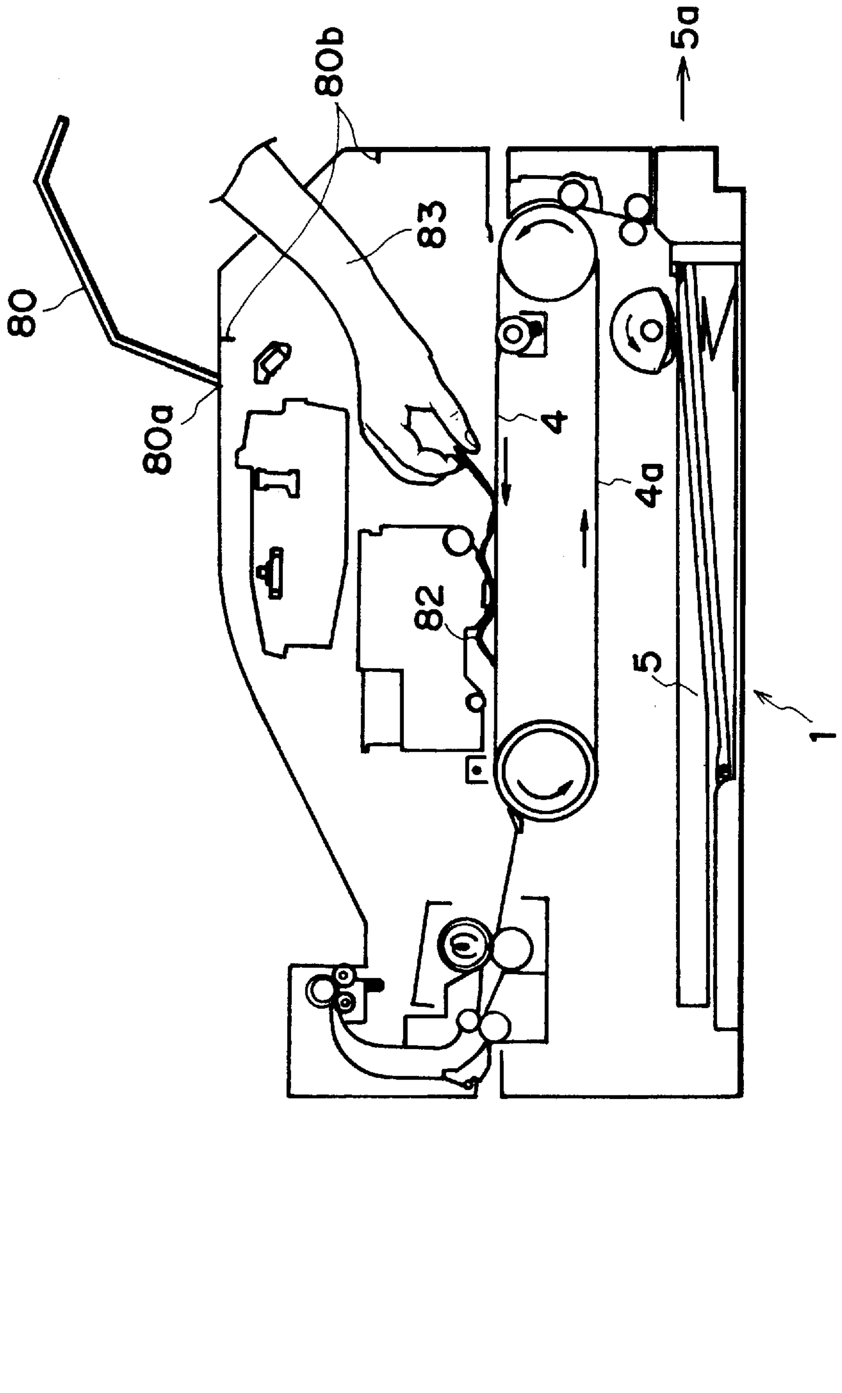
FIG. 14 is a schematic illustration showing an image forming apparatus according to an eighth embodiment of the present invention.

FIG. 14 shows an eighth embodiment of the present invention. According to the eighth embodiment, if the recording sheet is jammed on the endless belt 4, after the electrophotographic process cartridge of the first recording means 2 is removed from the image forming apparatus, a jammed recording sheet 82 can be removed by an operator's hand 83. On the other hand, if the recording sheet is jammed on the lower run 4*a* of the endless belt 4, after the sheet cassette 5 is dismounted from the apparatus along a direction shown by the arrow 5*a*, the jammed sheet can be removed by the operator's hand. Incidentally, when the recording operation is not effected, since the ink jet recording portion of the second recording means 3 is retracted to the retract position, the second recording means is shown by the phantom line spaced apart from the endless belt 4.

(Ninth Embodiment)

Figure 15:
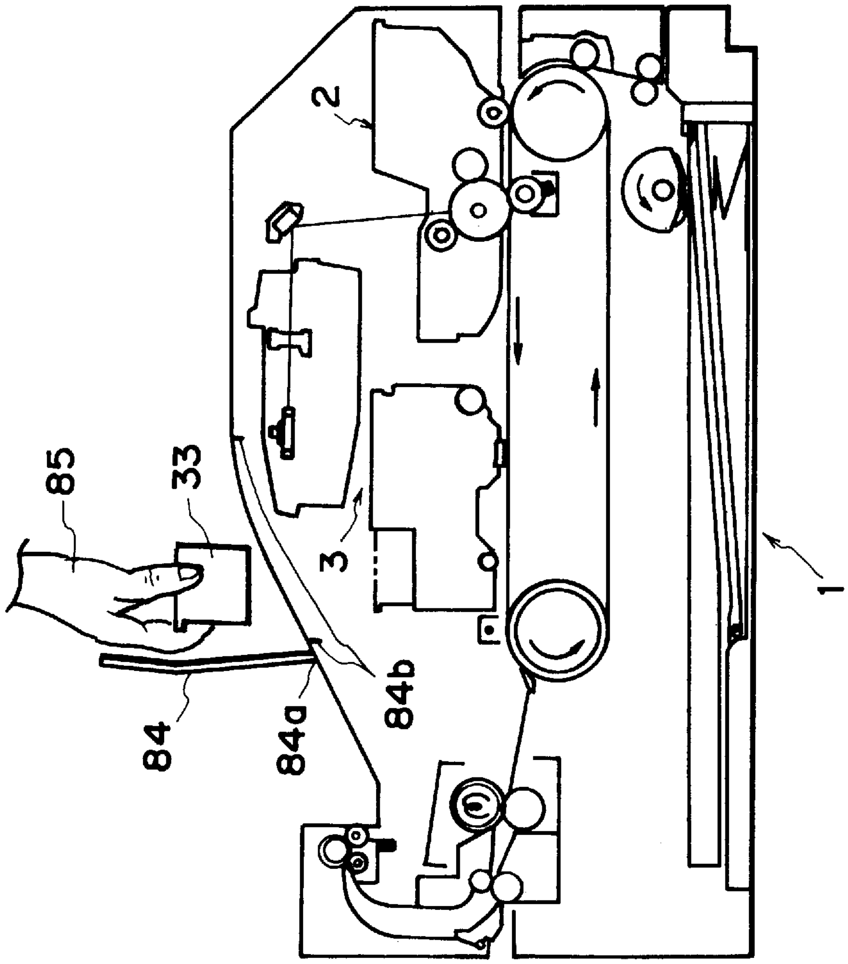
FIG. 15 is a schematic illustration showing an image forming apparatus according to a ninth embodiment of the present invention.

FIG. 15 shows a ninth embodiment of the present invention. In this embodiment, an opening 84*b* is formed on an outer surface of the image forming apparatus 1 of the first embodiment, and there is additionally provided a door 84 for closing and opening the opening 84*b*. The door 84 is pivotally mounted to the apparatus via a fulcrum 84*a*. When the door 84 is opened, the ink tanks 33 of the second recording means 3 comprised of the ink jet recording portion (positioned in a phantom line position) can be removed from the apparatus by an operator's hand 85.

In this way, since the ink tanks 33 can easily be dismounted from the image forming apparatus having the first and second recording means 2, 3, the ink can be changed by the operator, as is in the ink jet image forming apparatuses widely used nowadays, thereby achieving so-called "maintenance-free operation". While this embodiment was explained in connection with the image forming apparatus 1 of the first embodiment, this embodiment can be applied to the image forming apparatuses 101, 200, 201, 90, 94 according to the second to sixth embodiments.

(Tenth Embodiment)

Figure 16:
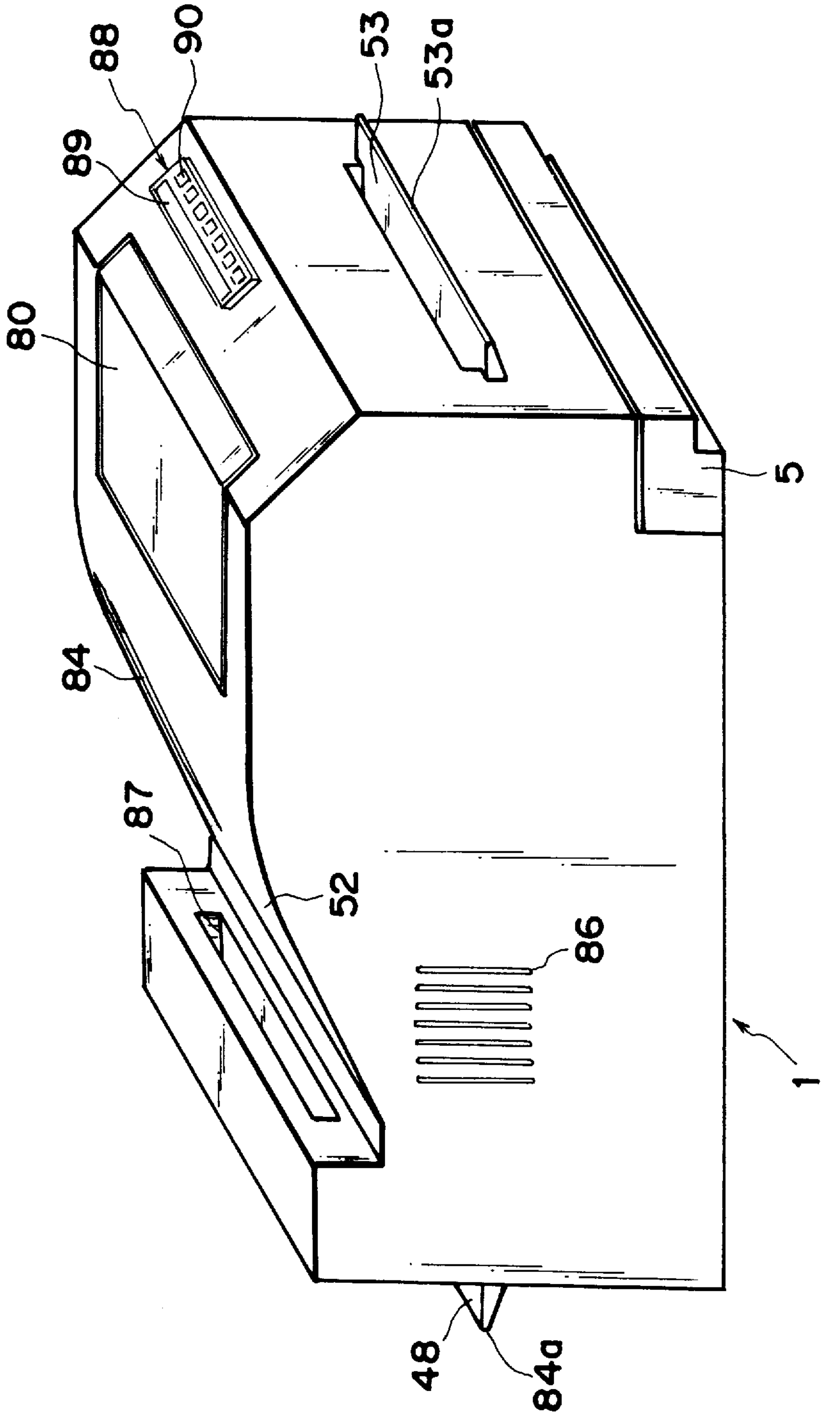
FIG. 16 is a perspective view of an image forming apparatus according to a tenth embodiment of the present invention.

FIG. 16 is a perspective view of an image forming apparatus 1 according to a tenth embodiment of the present invention.

The image forming apparatus 1 includes a lower removable sheet cassette 5, and a manual sheet insertion opening 53 (for a thick sheet and the like) having a guide 53*a*. The apparatus further is provided at its outer surface with an operation panel 88 including a display 89 and operation switches 90. Further, the apparatus has a door 80 for exchanging the electrophotographic process cartridge of the first recording means 2 and for treating the jammed sheet, and a door 84 for exchanging the ink tanks 33 of the second recording means 3 of ink jet recording type.

The recording sheet on which the composite image was formed by the first and second recording means 2, 3 is discharged onto a stacker 52 formed on an upper surface of the apparatus through a discharge opening 87 in the face-down fashion. A thick sheet or the like is discharged through a discharge opening 48 in the face-up fashion. The discharge opening 48 is provided with a guide 48*a* for guiding a lower surface of the recording sheet. Further, there are provided air discharge openings 86 for discharging hot air agitated within the apparatus by a fan for reducing a temperature in the apparatus.

The appearance having the above-mentioned elements is based on the first, fifth, sixth, seventh, eighth and ninth embodiments. In the arrangement wherein the first and second recording means are provided above the common convey means, since the sheet jam treatment can be performed by removing the electrophotographic process cartridge or the sheet cassette, the entire apparatus can be made compact. Incidentally, the process cartridge is fully explained in connection with the first embodiment.

As mentioned above, according to the present invention, in the image forming apparatus including the first and second recording means having different image forming methods capable of recording the images on the single recording sheet in a superimposed fashion and wherein the convey means comprised of the single cylindrical drum or the single belt is commonly used with respect to two recording means, since the distance between the first and second recording means can be shorter than the length (in the recording sheet conveying direction) of the recording sheet, the entire apparatus can be made compact. Further, by using the common convey means, the deviation between the images formed by the first and second recording means can be minimized.

What is claimed is:

1. An image forming apparatus for forming a multi-image on a surface of a single recording sheet by two types of recording, comprising:

first recording means of an electrophotographic recording type;

second recording means of an ink-jet recording type; and convey means for supporting a recording sheet and being movable along an endless convey path to successively convey the recording sheet in one direction to a first recording position of said first recording means, and then to a second recording position of said second recording means, in one cycle;

wherein a recording speed of said first recording means is faster than a recording speed of said second recording means, and a distance between the first and second recording positions is shorter than a maximum length of the recording sheet to be conveyed by said convey means, and wherein, when a multi-image is formed on the surface of the recording sheet by said first and second recording means, the recording sheet passes through the first and second recording positions twice, respectively, to be recorded by said first recording means in a first cycle and by said second recording means in a second cycle in which said first recording means does not contact the recording sheet.

2. An image forming apparatus according to claim 1, wherein said second recording means comprises a color ink-jet recording means using color ink.

3. An image forming apparatus according to claim 2, wherein said second recording means effects recording in a predetermined width while shifting a direction perpendicular to a recording sheet conveying direction, and wherein, when the recording is effected to the recording sheet by said second recording means, said convey means for conveying the recording sheet is intermittently driven synchronously with recording.

4. An image forming apparatus according to claim 1, wherein said convey means has a belt supported by at least two substantially cylindrical rollers.

5. An image forming apparatus according to claim 4, further comprising regulating means for regulating said belt from shifting along the length of said cylindrical rollers.

6. An image forming apparatus according to claim 5, wherein said regulating means comprises at least one tapered rib formed on at least a part of said cylindrical rollers.

7. An image forming apparatus according to claim 5, wherein said regulating means comprises at least one additional substantially cylindrical roller for regulating said belt from shifting along the length of said cylindrical rollers.

8. An image forming apparatus according to claim 4, wherein a corona discharger is disposed in the vicinity of said belt or a charge roller having an electrically intermediate resistance value is contacted with said belt, and said belt is formed from material having an electrically intermediate resistance value to attract the recording sheet electrostatically.

9. An image forming apparatus according to claim 1, wherein a corona discharger is disposed in the vicinity of a drum in said first recording means or a charge roller having an electrically intermediate resistance value is contacted with said drum, and said drum is formed from material having an electrically intermediate resistance value to attract the recording sheet electrostatically.

10. An image forming apparatus according to claim 9, wherein said drum comprises a cylindrical base drum made of metal or resin, and an outer layer having an electrically intermediate resistance value is coated on an outer peripheral surface of said base drum.

11. An image forming apparatus according to claim 8 or 9, wherein said belt or said drum is provided with a gripper to be driven together with said belt or said drum to convey the recording sheet.

12. An image forming apparatus according to claim 8 or 9, wherein said belt or said drum is provided with a gripper, and said corona discharger is disposed in the vicinity of said belt or said drum, or said charge roller having an electrically intermediate resistance value is contacted with said belt or said drum having an electrically intermediate resistance value to attract the recording sheet electrostatically.

13. An image forming apparatus according to claim 1, wherein said first recording means comprises an electrophotographic process cartridge removably mounted to a main body of the image forming apparatus and said second recording means comprises an ink jet recording head, and wherein a sheet jam treatment is effected by dismounting said process cartridge.

14. An image forming apparatus for forming a multi-image on a surface of a single recording sheet by two types of recording, comprising:

a first recording unit of an electrophotographic recording type including an electrophotographic photosensitive member;

a second recording unit of an ink-jet recording type using color ink, said second recording unit effecting recording in a predetermined width while being reciprocally shifted along guide means in a direction perpendicular to a recording sheet conveying direction; and a convey mechanism for supporting a recording sheet and being movable along an endless convey path to successively convey the recording sheet in one direction to a first recording position of said first recording unit, and then to a second recording position of said second recording unit in one cycle;

wherein a distance between the first and second recording positions is shorter than a maximum length of the recording sheet to be conveyed by said convey mechanism, and wherein, when a multi-image is formed on the surface of the recording sheet by said first and second recording units, a first image is recorded by only said first recording unit in a first cycle, and a second image is then recorded by only said second recording unit in a second cycle in which the first recording unit does not contact the recording sheet.

15. An image forming apparatus according to claim 14, wherein, after the first and second images are recorded on the recording sheet by said first and second recording units, the first and second images are simultaneously fixed by a fixing means.

16. An image forming apparatus according to claim 14, wherein said convey mechanism is selectively driven in a continuous manner or an intermittent manner.

17. An image forming apparatus according to claim 14, further comprising a spacing means for separating said first recording unit from the recording sheet when the recording is executed by said second recording unit.

18. An image forming apparatus according to claim 14, wherein recording by said first recording unit alone or recording by said second recording unit alone can be executed selectively.

19. An image forming apparatus as claimed in claim 14, wherein said first recording unit comprises a process cartridge including at least one of a charger, a developing device and a cleaning device as a cartridge unit removably mounted to a main body of said image forming apparatus.

* * * * *

UNITED STATES PATENT AND TRADEMARK OFFICE
CERTIFICATE OF CORRECTION

PATENT NO. : 5,867,181

DATED : February 2, 1999

INVENTOR(S) : NAKANE ET AL.

It is certified that error appears in the above-indentified patent and that said Letters Patent is hereby corrected as shown below:

On the title page, item:

[56] References Cited:

FOREIGN PATENT DOCUMENTS, "5-4134824" should read -5-134824--.

COLUMN 3:

Line 10, "at" should be deleted.

COLUMN 16:

Line 10, ""maintenance-free " should read --"maintenance-free"--.

Line 11, " operation"." should read --operation.--.

Line 65, ""maintenance-free operation"." should read --"maintenance-free" operation.--.

UNITED STATES PATENT AND TRADEMARK OFFICE

CERTIFICATE OF CORRECTION

PATENT NO. : 5,867,181

DATED : February 2, 1999

INVENTOR(S) : NAKANE ET AL.

It is certified that error appears in the above-identified patent and that said Letters Patent is hereby corrected as shown below:

COLUMN 18:

Line 21, "has" should read --comprises--.

Signed and Sealed this

Seventh Day of September, 1999

Attest:

Q. TODD DICKINSON

Attesting Officer

*Acting Commissioner of Patents and Trademarks*